(12) United States Patent
Neidhardt et al.

(10) Patent No.: US 12,618,944 B2
(45) Date of Patent: May 5, 2026

(54) VEHICLE SENSOR TESTING WITH FIELD OF VIEW ENHANCEMENT

(71) Applicant: Rohde & Schwarz GmbH & Co. KG, Munich (DE)

(72) Inventors: Steffen Neidhardt, Dorfen (DE); Maximilian Bogner, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 274 days.

(21) Appl. No.: 18/545,333

(22) Filed: Dec. 19, 2023

(65) Prior Publication Data

US 2025/0199120 A1     Jun. 19, 2025

(51) Int. Cl.
*G01S 7/40* (2006.01)
*G01S 13/931* (2020.01)

(52) U.S. Cl.
CPC .......... *G01S 7/4052* (2013.01); *G01S 13/931* (2013.01); *G01S 2013/9323* (2020.01)

(58) Field of Classification Search
CPC ................. G01S 13/931; G01S 17/931; G01S 2013/9323; G01S 7/40; G01S 7/4021; G01S 7/4052; G01S 7/4086; G01S 7/4095; G01S 7/497
See application file for complete search history.

(56) References Cited

U.S. PATENT DOCUMENTS

| | | | | |
|---|---|---|---|---|
| 4,578,870 A | * | 4/1986 | Cooke | G01B 11/27 |
| | | | | 33/608 |
| 5,892,479 A | * | 4/1999 | Mills | G01S 7/4052 |
| | | | | 342/170 |
| 6,087,995 A | * | 7/2000 | Grace | G01S 7/4052 |
| | | | | 342/174 |
| 6,363,619 B1 | * | 4/2002 | Schirmer | G01M 11/067 |
| | | | | 33/600 |
| 6,583,868 B2 | * | 6/2003 | Hopfenmuller | G01M 11/067 |
| | | | | 340/904 |
| 6,636,172 B1 | * | 10/2003 | Prestl | G01S 7/4026 |
| | | | | 342/174 |
| 6,778,131 B2 | * | 8/2004 | Haney | G01S 13/931 |
| | | | | 343/703 |
| 6,823,601 B2 | * | 11/2004 | Murray | G01B 11/27 |
| | | | | 33/645 |
| 7,121,011 B2 | * | 10/2006 | Murray | G01B 11/2755 |
| | | | | 33/203.18 |
| 7,221,310 B2 | * | 5/2007 | Nakagawa | G01S 7/4026 |
| | | | | 342/158 |
| 8,830,119 B2 | * | 9/2014 | Borruso | G01S 7/4026 |
| | | | | 342/167 |
| 8,973,278 B2 | * | 3/2015 | Ham | G01B 5/24 |
| | | | | 33/549 |

(Continued)

FOREIGN PATENT DOCUMENTS

| | | |
|---|---|---|
| CN | 212483836 U | 2/2021 |

*Primary Examiner* — Peter M Bythrow

(74) *Attorney, Agent, or Firm* — Studebaker Brackett PLLC

(57) ABSTRACT

A system for testing an emitting sensor of a vehicle is provided. Said system comprises a tester for testing the sensor, e.g. by simulating a target for the sensor's emission, and a holding arrangement, especially a holder, for holding the tester. In this context, the holding arrangement is adapted to be mounted on the vehicle and to hold the tester at a certain distance in front of the sensor.

17 Claims, 6 Drawing Sheets

(56)                References Cited

U.S. PATENT DOCUMENTS

| | | | | |
|---|---|---|---|---|
| 9,170,101 B2* | 10/2015 | Stieff | G01S 13/931 |
| 9,581,524 B2* | 2/2017 | Liu | G01M 17/013 |
| 9,645,051 B2* | 5/2017 | Jin | G01M 17/007 |
| 9,705,189 B2* | 7/2017 | Weber | H01Q 1/42 |
| 10,288,721 B2* | 5/2019 | Paap | G01B 11/272 |
| 10,323,936 B2* | 6/2019 | Leikert | G01B 11/2755 |
| 10,371,509 B2* | 8/2019 | Rogers | B60R 11/04 |
| 10,458,811 B2* | 10/2019 | Voeller | G01S 13/931 |
| 10,502,812 B2* | 12/2019 | Fujii | G01S 7/4026 |
| 10,527,714 B2* | 1/2020 | Genghammer | H04B 17/21 |
| 10,585,170 B2* | 3/2020 | Hellinger | G01S 7/4026 |
| 10,921,426 B2* | 2/2021 | Tang | G01S 7/4017 |
| 11,029,390 B2* | 6/2021 | Fath | G01S 7/4026 |
| 11,131,740 B2* | 9/2021 | Houk | G01S 13/931 |
| 11,145,087 B2* | 10/2021 | Margol | B60R 11/04 |
| 11,175,381 B2* | 11/2021 | Wang | F16M 11/18 |
| 11,209,526 B2* | 12/2021 | Park | H01Q 1/3283 |
| 11,215,695 B2* | 1/2022 | Shen | H01Q 1/125 |
| 11,231,485 B2* | 1/2022 | Okubo | G01S 13/867 |
| 11,243,074 B2* | 2/2022 | DeBoer | G01B 11/275 |
| 11,346,658 B2* | 5/2022 | Leikert | G01B 11/2755 |
| 11,835,646 B2* | 12/2023 | Jefferies | G01B 11/275 |
| 11,836,947 B2* | 12/2023 | Corghi | H04N 17/002 |
| 11,867,800 B2* | 1/2024 | Lai | G01S 7/4034 |
| 11,892,560 B2* | 2/2024 | Yu | G01S 17/86 |
| 12,092,757 B2* | 9/2024 | Linson | G01S 13/931 |
| 12,172,654 B2* | 12/2024 | Jefferies | B60W 40/10 |
| 12,345,800 B2* | 7/2025 | Burger | G01S 15/42 |
| 12,385,766 B2* | 8/2025 | Lawrence | G01B 11/272 |
| 2002/0105456 A1* | 8/2002 | Isaji | G01S 7/4026 |
| | | | 342/174 |

| | | | | |
|---|---|---|---|---|
| 2003/0090411 A1* | 5/2003 | Haney | G01S 7/4026 |
| | | | 342/174 |
| 2004/0165174 A1* | 8/2004 | Knoedler | G01M 11/067 |
| | | | 340/992 |
| 2010/0237655 A1* | 9/2010 | Mehs | B60R 11/04 |
| | | | 296/187.01 |
| 2013/0110314 A1* | 5/2013 | Stieff | G01B 11/275 |
| | | | 701/1 |
| 2013/0239420 A1* | 9/2013 | Kroll | G01B 11/275 |
| | | | 33/228 |
| 2013/0325252 A1* | 12/2013 | Schommer | G01S 7/52004 |
| | | | 701/33.1 |
| 2014/0022115 A1* | 1/2014 | Borruso | G01S 7/4972 |
| | | | 342/167 |
| 2014/0259707 A1* | 9/2014 | Jones | G01S 7/4026 |
| | | | 33/286 |
| 2016/0161602 A1* | 6/2016 | Prokhorov | G01S 7/4972 |
| | | | 702/97 |
| 2016/0245899 A1* | 8/2016 | Rybski | G01S 7/497 |
| 2017/0212215 A1* | 7/2017 | Hellinger | G01S 13/931 |
| 2017/0307732 A1* | 10/2017 | Haghighi | G01S 7/4056 |
| 2018/0106888 A1* | 4/2018 | Heuel | G01S 13/34 |
| 2019/0064320 A1* | 2/2019 | Zack | G01S 7/40 |
| 2019/0187249 A1* | 6/2019 | Harmer | G01S 7/40 |
| 2019/0204425 A1* | 7/2019 | Abari | G01S 7/497 |
| 2020/0103496 A1* | 4/2020 | Konrad | G01S 7/4095 |
| 2020/0348129 A1* | 11/2020 | DeBoer | G01B 11/275 |
| 2021/0278203 A1* | 9/2021 | Corghi | G01B 11/2755 |
| 2022/0073036 A1* | 3/2022 | Jackson, Jr. | G01S 7/40 |
| 2022/0402515 A1* | 12/2022 | Aono | B60W 60/001 |
| 2023/0005183 A1* | 1/2023 | Cantadori | G07C 5/0808 |

* cited by examiner

10

20

41c

41a

41b

14

101

Arranging a holding arrangement, especially a holding arrangement according to the second aspect of the disclosure or any of its implementation forms, respectively, on the vehicle

102

Holding a tester for testing the sensor, e.g. by simulating a target for the sensor's emission, at a certain distance in front of the sensor with the aid of the holding arrangement

VEHICLE SENSOR TESTING WITH FIELD OF VIEW ENHANCEMENT

TECHNICAL FIELD

The disclosure relates to vehicle sensor testing with field of view enhancement. In particular, the disclosure relates to a system for testing a sensor of a vehicle, holding arrangement, especially a holder, for holding a tester for testing a sensor of a vehicle, especially for use in the context of such a system, and a method for testing a sensor of a vehicle.

BACKGROUND ART

Generally, in times of an increasing number of applications employing vehicle sensors, exemplarily used in the context of advanced driver assistance systems or autonomous vehicles, there is a growing need of a system with a tester, a holding arrangement, especially for holding such a tester, and a corresponding method for performing measurements or tests, respectively, with respect to such applications or vehicle sensors, respectively, in order to verify their correct functioning.

Document CN 212483836 U provides a detection angle real vehicle calibration system of a vehicle-mounted millimeter wave radar, which is used for real vehicle calibration of a to-be-measured radar covered with a rear bumper. The system comprises a target rotation center determining system, a target height adjusting system installed on a rotation driving system and connected with the target rotation center determining system through a rotation arm, and a target simulator installed on the rotation arm.

Disadvantageously, such a configuration of the vehicle calibration system according to said document does not allow for testing a vehicle sensor in a particularly efficient manner, especially in the sense of achieving an enhanced field of view testing or full field of view testing, respectively, with respect to such a vehicle sensor without additional fix points.

SUMMARY

Thus, there is a need to provide a system for testing a sensor of a vehicle, holding arrangement, especially a holder, for holding a tester for testing a sensor of a vehicle, especially for use in the context of such a system, and a method for testing a sensor of a vehicle, thereby allowing for a particularly high efficiency, especially in the sense of achieving an enhanced field of view testing or full field of view testing, respectively, with respect to such a vehicle sensor without additional fix points.

This is achieved by the embodiments provided in the enclosed independent claims. Advantageous implementations of the present disclosure are further defined in the dependent claims.

According to a first aspect of the disclosure, a system for testing an emitting sensor of a vehicle is provided. Said system comprises a tester for testing the sensor, e.g. by simulating a target for the sensor's emission, and a holding arrangement, especially a holder, for holding the tester. In this context, the holding arrangement is adapted to be mounted on the vehicle and to hold the tester at a certain distance in front of the sensor. Advantageously, this allows for a particularly high efficiency, especially in the sense of achieving an enhanced field of view testing or full field of view testing, respectively, with respect to a vehicle sensor without additional fix points. Further advantageously, a high repeatability, easiness of use, and a high testing speed can be achieved. In this context, a repeatable and precise determination of the position and angle of the tester can especially be achieved.

According to an implementation form of the first aspect of the disclosure, the holding arrangement is adapted for movement, especially azimuth movement or repeatable azimuth movement, of the tester, preferably to cover the corresponding field of view of the sensor. Advantageously, for instance, the sensor field of view can fully be covered in the context of testing.

According to a further implementation form of the first aspect of the disclosure, the tester comprises or is a radar or lidar (light detecting and ranging) object simulator and/or a power sensor. Advantageously, for example, radar or lidar sensors can efficiently be tested. Accordingly, it is noted that the sensor can especially comprise or be a radar or lidar sensor.

According to a further implementation form of the first aspect of the disclosure, the holding arrangement is directly mountable and/or directly mounted to the vehicle, especially to a movable and/or rotatable part of the vehicle. Advantageously, for instance, for covering full sensor field of view, the holding arrangement does not necessarily have to comprise movable and/or rotatable parts.

According to a further implementation form of the first aspect of the disclosure, the holding arrangement is rigid or substantially rigid. Advantageously, for example, complexity can be reduced, thereby increasing efficiency, especially cost-efficiency.

According to a further implementation form of the first aspect of the disclosure, the certain distance is between 0.5 meters and 20 meters, preferably between 1 meter and 10 meters, more preferably between 1.5 meters and 5 meters, most preferably between 2 meters and 4 meters. Advantageously, for instance, efficiency can further be increased.

According to a further implementation form of the first aspect of the disclosure, the holding arrangement is mountable and/or mounted to at least one wheel, especially a wheel or two wheels, of the vehicle. Advantageously, for example, full sensor field of view can efficiently be covered by utilizing steering of the wheel or wheels, respectively.

According to a further implementation form of the first aspect of the disclosure, the holding arrangement is mounted to the at least one wheel with the aid of at least one nut and/or at least one bolt. Advantageously, for instance, complexity can be reduced, which leads to an increased efficiency, especially cost-efficiency.

According to a further implementation form of the first aspect of the disclosure, the holding arrangement is mountable and/or mounted to a fixed location, especially a frame, of the vehicle. Advantageously, for example, space requirements of the system can be reduced, thereby saving costs.

According to a further implementation form of the first aspect of the disclosure, the system further comprises a controller for controlling the tester and/or acquiring testing data from the tester. Advantageously, for instance, the tester can be operated in an automated manner, thereby increasing cost-efficiency.

According to a further implementation form of the first aspect of the disclosure, the system further comprises an optical device, especially an imager or a scanner or a camera, for acquiring position data and/or status information with respect to the location on which the holding arrangement is arrangeable and/or arranged. Advantageously, for example, especially by providing said position data and/or status information for the above-mentioned controller, the system can be operated in an automated manner regardless of vehicle type, thereby increasing not only flexibility but also efficiency.

According to a further implementation form of the first aspect of the disclosure, the optical device is configured to acquire further position data and/or further status information, especially an angle or steering angle, with respect to the steering and/or steering wheel and/or a steerable and/or steered wheel of the vehicle. Advantageously, for instance, especially for the case that the holding arrangement is attached to a wheel or steerable and/or steered wheel, respectively, said further position data and/or further status information can be used to efficiently draw conclusions about the position of the tester. Further advantageously, the position of the tester can be controlled by controlling the steering and/or steering wheel and/or steerable and/or steered wheel, especially without providing any actuator for the holding arrangement or through embodying the holding arrangement exclusively with passive components, respectively, thereby saving costs.

According to a further implementation form of the first aspect of the disclosure, the system further comprises an interface, especially an on-board diagnosis interface, for reading diagnosis data from the vehicle. Advantageously, for example, vehicle sensor testing can comprise comparing sensor data acquired from said diagnosis data with measured sensor data acquired with the aid of the tester, thereby exemplarily providing an automated plausibility check regarding sensor testing in an efficient manner.

According to a further implementation form of the first aspect of the disclosure, the diagnosis data comprises or is diagnosis data, especially an angle or steering angle, with respect to the steering and/or steering wheel and/or a steerable and/or steered wheel of the vehicle. Additionally or alternatively, the diagnosis data comprises or is diagnosis data, especially sensor data, with respect to the sensor of the vehicle. Advantageously, for instance, especially by providing said diagnosis data for the above-mentioned controller, the system can be operated in an automated manner regardless of vehicle type, thereby increasing not only flexibility but also efficiency.

According to a further implementation form of the first aspect of the disclosure, the system further comprises an actuator for actuating the steering and/or the steering wheel and/or a steerable and/or steered wheel of the vehicle. Advantageously, for example, especially for the case that the holding arrangement is attached to a wheel or steerable and/or steered wheel, respectively, the position of the tester can be controlled by controlling the steering and/or steering wheel and/or steerable and/or steered wheel in an automated manner, especially without providing any actuator for the holding arrangement or through embodying the holding arrangement exclusively with passive components, respectively, thereby increasing efficiency or cost-efficiency, respectively.

According to a second aspect of the disclosure, a holding arrangement, especially a holder, for holding a tester for testing an emitting sensor of a vehicle, e.g. by simulating a target for the sensor's emission, especially for use in the context of a system according to the first aspect of the disclosure or any of its implementation forms, respectively, is provided. Said holding arrangement comprises a connecting portion of a certain length with a first end and a second end, an arrangement portion arranged at the first end, and a holding portion arranged at the second end. In this context, the holding portion is adapted to hold the tester, especially in front of the sensor. Additionally, the arrangement portion is adapted to be mounted on the vehicle. Advantageously, this allows for a particularly high efficiency, especially in the sense of achieving an enhanced field of view testing or full field of view testing, respectively, with respect to a vehicle sensor without additional fix points. Further advantageously, a high repeatability, easiness of use, and a high testing speed can be achieved. In this context, a repeatable and precise determination of the position and angle of the tester can especially be achieved.

According to an implementation form of the second aspect of the disclosure, the arrangement portion is adapted to be directly mountable and/or directly mounted to the vehicle, especially to a movable and/or rotatable part of the vehicle. Advantageously, for instance, for covering full sensor field of view, the holding arrangement does not necessarily have to comprise movable and/or rotatable parts.

According to a further implementation form of the second aspect of the disclosure, the connecting portion is rigid or substantially rigid. Advantageously, for example, complexity can be reduced, thereby increasing efficiency, especially cost-efficiency.

According to a further implementation form of the second aspect of the disclosure, the certain length is between 0.5 meters and 20 meters, preferably between 1 meter and 10 meters, more preferably between 1.5 meters and 5 meters, most preferably between 2 meters and 4 meters. Advantageously, for instance, efficiency can further be increased.

According to a third aspect of the disclosure, a method for testing an emitting sensor of a vehicle is provided. Said method comprises the steps of mounting a holding arrangement, especially a holding arrangement according to the second aspect of the disclosure or any of its implementation forms, respectively, on the vehicle, and holding a tester for testing the sensor, e.g. by simulating a target for the sensor's emission, at a certain distance in front of the sensor with the aid of the holding arrangement. Advantageously, this allows for a particularly high efficiency, especially in the sense of achieving an enhanced field of view testing or full field of view testing, respectively, with respect to a vehicle sensor without additional fix points. Further advantageously, a high repeatability, easiness of use, and a high testing speed can be achieved. In this context, a repeatable and precise determination of the position and angle of the tester can especially be achieved.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTIONS OF
EMBODIMENTS

Figure 1:
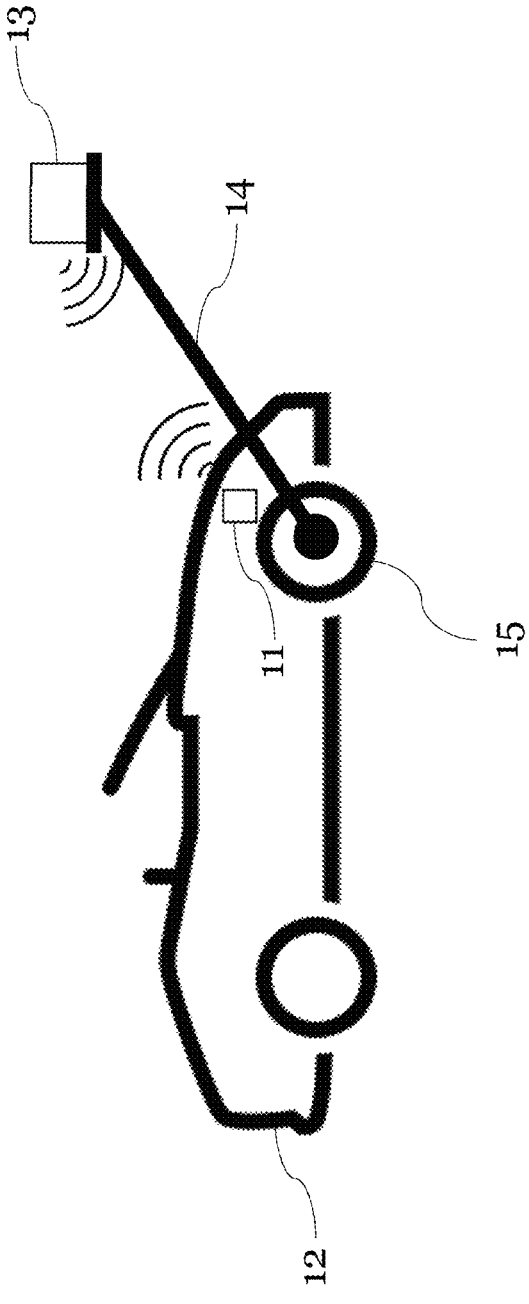
FIG. 1 shows an exemplary embodiment of a system according to the first aspect of the disclosure in combination with the second aspect of the disclosure.
Figure 1:

With respect to FIG. 1, an exemplary embodiment of a system 10 for testing an emitting sensor 11 of a vehicle 12, exemplarily a car, is depicted. Said system 10 comprises a tester 13 for testing the sensor 11, e.g. by simulating a target for the sensor's emission, and a holding arrangement 14, especially a holder, for holding the tester 13. In this context, the holding arrangement 14 is adapted to be mounted on the vehicle 12 and to hold the tester 13 at a certain distance in front of the sensor 11.

It is noted that it might be particularly advantageous if the holding arrangement 14 is adapted for movement, especially azimuth movement or repeatable azimuth movement, of the tester 13, preferably to cover the corresponding field of view of the sensor 11.

It is further noted that the tester 13 exemplarily comprises or is a radar or lidar object simulator and/or a power sensor. Further exemplarily, the sensor 11 comprises or is a radar or lidar sensor.

As it can further be seen from FIG. 1, in this exemplary case, the holding arrangement 14 is directly mounted to the vehicle 12, especially to a movable and/or rotatable part of the vehicle 12, exemplarily to a steerable and/or steered wheel 15 of the vehicle 12.

Furthermore, the holding arrangement 14 is exemplarily rigid or substantially rigid, respectively. It is noted that the foregoing term "substantially rigid" can especially be understood as at least 75 percent, preferably at least 80 percent, more preferably at least 90 percent, most preferably at least 95 percent, of the holding arrangement 14, especially the corresponding components and/or parts of the holding arrangement 14, are rigid.

It is noted that it might be particularly advantageous if the above-mentioned certain distance, exemplarily the distance between the corresponding wheel 15 of the vehicle 12, to which the holding arrangement 14 is attached or mounted, respectively, or the sensor 11, respectively, and the tester 13, is between 0.5 meters and 20 meters, preferably between 1 meter and 10 meters, more preferably between 1.5 meters and 5 meters, most preferably between 2 meters and 4 meters.

With respect to the above-mentioned attachment or mounting, respectively, of the holding arrangement 14 to the corresponding wheel 15 of the vehicle 12, it is noted that it might be particularly advantageous if the holding arrangement 14 is attached or mounted, respectively, to the corresponding wheel 15, which could also be two wheels, especially two parallel wheels, with the aid of at least one nut and/or at least one bolt.

It is further noted that, especially as an alternative to attaching or mounting, respectively, the holding arrangement 14 to the corresponding wheel 15 of the vehicle 12, the holding arrangement 14 can be attached or mounted, respectively, to a fixed location, especially a frame, of the vehicle 12.

Figure 2:
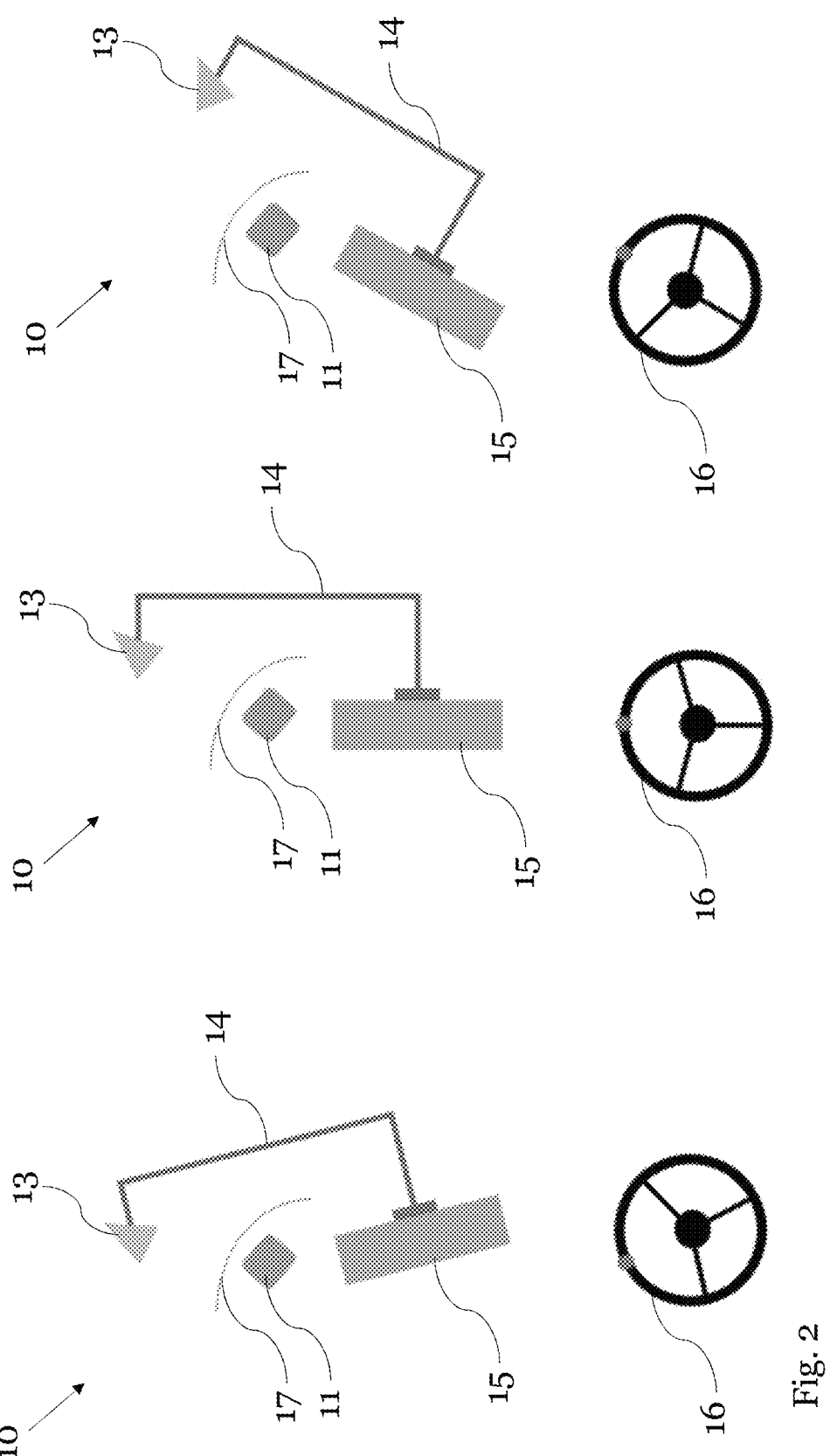
FIG. 2 illustrates an exemplary testing scenario with respect to the system according to FIG. 1 with three different steering wheel positions.

Now, with respect to FIG. 2, a testing scenario with respect to the system 10 is illustrated. As it can be seen, three different positions of the steering or steering wheel 16, respectively, are depicted. On the left hand of FIG. 2, the steering wheel 16 is positioned in a left turn manner, whereas on the right hand, the steering wheel 16 is positioned in a right turn manner. In addition to this, the middle of FIG. 2 shows the corresponding steering wheel position for driving straight ahead.

Advantageously, especially due to the rigidness or substantial rigidness, respectively, of the holding arrangement 14, by steering the steering or the steering wheel 16, respectively, of the vehicle 12, the tester 13 can be moved over the field of view, especially the full field of view, of the sensor 11 which is exemplarily covered by a bumper 17.

Further advantageously, also especially due to the rigidness or substantial rigidness, respectively, of the holding arrangement 14 or especially due to the fact that the corresponding dimensions of the holding arrangement 14 are known, respectively, the corresponding position and/or angle of the tester 13 can be determined with respect to the vehicle 12 preferably in a repeatable manner or in a particularly precise manner, respectively.

With respect to the following embodiments, it is noted that identical or analogous parts or elements, respectively, of each of said embodiments are not explicitly explained again but rather equipped with the same reference signs. For such identical or analogous parts or elements, respectively, the explanations above can analogously apply, and vice versa.

Figure 3:
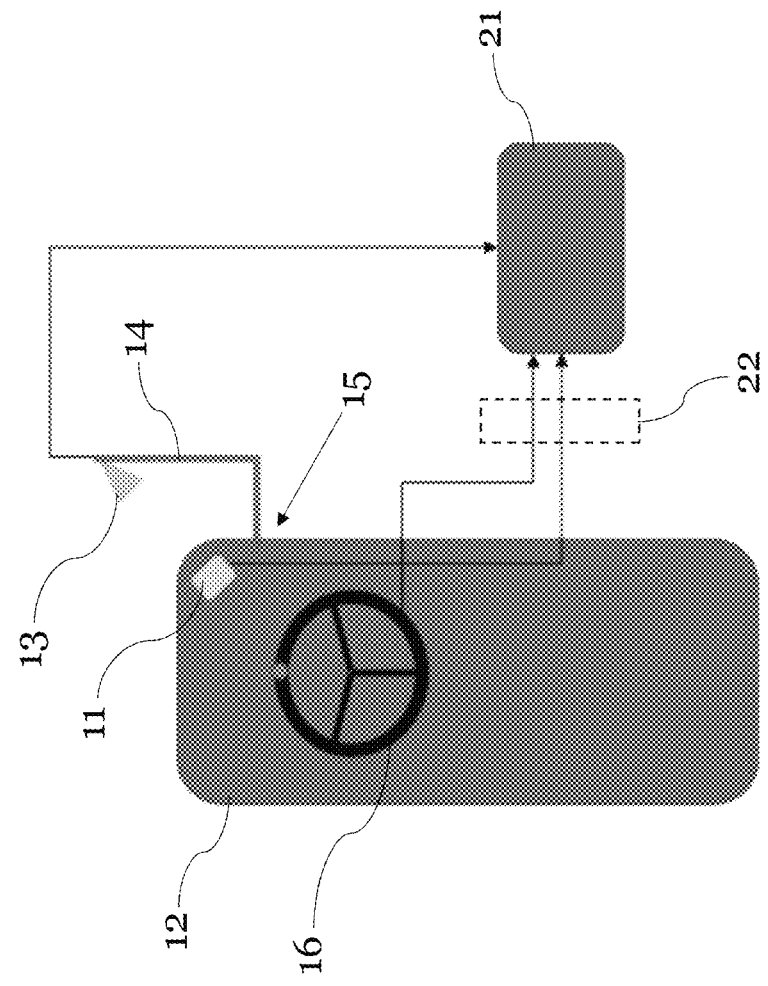
FIG. 3 shows a further exemplary embodiment of a system based on FIG. 1.

Now, with respect to FIG. 3, a further exemplary embodiment 20 of a system based on the above-mentioned system 10 according to FIG. 1 or FIG. 2, respectively, is depicted. Said system 20 of FIG. 3 differs from the system 10 especially in that the system 20 further a controller 21, exemplarily a computer or a smartphone or a tablet. Said controller 21 is exemplarily configured to control the tester 13 and/or to acquire testing data from the tester 13.

Furthermore, the controller 21 can be configured to control the steering of the vehicle 12 and/or the steering wheel 16 of the vehicle 12 and/or a steerable and/or steered wheel, exemplarily the wheel 15, of the vehicle 12. Additionally or alternatively, the controller 21 can be configured to acquire position data and/or status information, especially an angle or steering angle, with respect to the steering of the vehicle 12 and/or the steering wheel 16 of the vehicle 12 and/or a steerable and/or steered wheel, exemplarily the wheel 15, of the vehicle 12.

For this purpose, as it can exemplarily be seen from FIG. 3, the system 20 especially comprises a wired and/or wireless and/or virtual and/or indirect connection between the controller 21 and the steering of the vehicle 12 and/or the steering wheel 16 of the vehicle 12 and/or a steerable and/or steered wheel, exemplarily the wheel 15, of the vehicle 12.

Moreover, the controller 21 can be configured to acquire sensor data from the sensor 11. For this purpose, as it can exemplarily be seen from FIG. 3, the system 20 especially comprises a wired and/or wireless and/or virtual and/or indirect connection between the controller 21 and the sensor 11.

It is noted that it might particularly advantageous if the controller 21 is configured to compare the above-mentioned sensor data acquired from the sensor 11 with measured sensor data acquired with the aid of the tester 13. In this context, the controller 21 may especially be configured to perform a plausibility check based on said comparison.

It is further noted that it might be particularly advantageous if the system 20 further comprises an interface 22, especially an on-board diagnosis interface, for reading diagnosis data from the vehicle 12.

Said interface 22 may be configured to implement the above-mentioned wired and/or wireless and/or virtual and/or indirect connection between the controller 21 and the steering of the vehicle 12 and/or the steering wheel 16 of the vehicle 12 and/or a steerable and/or steered wheel, exemplarily the wheel 15, of the vehicle 12. Additionally or alternatively, the interface 22 may be configured to implement the above-mentioned wired and/or wireless and/or virtual and/or indirect connection between the controller 21 and the sensor 11.

Accordingly, it might be particularly advantageous if the diagnosis data comprises or is diagnosis data, especially an angle or steering angle, with respect to the steering and/or steering wheel 16 and/or a steerable and/or steered wheel, exemplarily the wheel 15, of the vehicle 12, and/or the diagnosis data comprises or is diagnosis data, especially sensor data, with respect to the sensor 11 of the vehicle 12.

Furthermore, it is noted that it might be particularly advantageous if the controller 21 is configured to determine the corresponding position and/or the corresponding angle of the tester 13 with respect to the vehicle 12 especially in a repeatable manner. In this context, for instance, the controller 21 may be configured to control the tester 13 and/or to acquire testing data from the tester 13 on the basis of or by taking into account said corresponding position and/or said corresponding angle of the tester 13 with respect to the vehicle 12. Furthermore, the controller 21 can be configured to control the steering of the vehicle 12 and/or the steering wheel 16 of the vehicle 12 and/or a steerable and/or steered wheel, exemplarily the wheel 15, of the vehicle 12 on the basis of or by taking into account the corresponding position and/or the corresponding angle of the tester 13 with respect to the vehicle 12.

It is further noted that it might particularly advantageous if the controller 21 is configured to compare the above-mentioned sensor data acquired from the sensor 11 with the above-mentioned measured sensor data acquired with the aid of the tester 13 on the basis of or by taking into account the corresponding position and/or the corresponding angle of the tester 13 with respect to the vehicle 12. In this context, the controller 21 may especially be configured to perform a plausibility check based on said comparison.

With respect to the above-mentioned corresponding position and/or the above-mentioned corresponding angle of the tester 13, it is noted that it might be particularly advantageous if said corresponding position and/or said corresponding angle of the tester 13 with respect to the vehicle 12 is determined by the controller 21 on the basis of the fact that the holding arrangement 14 is rigid or substantially rigid, respectively, and/or that the corresponding dimensions of the holding arrangement 14 are known. Accordingly, it might be particularly advantageous if the controller 21 is configured to store the corresponding dimensions of the holding arrangement 14 preferably in a permanent manner.

Furthermore, especially in the context of the above-mentioned corresponding position and/or the above-mentioned corresponding angle of the tester 13 with respect to the vehicle 12, it is noted that it might be particularly advantageous if the controller 21 is configured to perform at least a part or each of the corresponding commands of the controller 21 related to the sensor 11 and/or the steering of the vehicle 12 and/or the tester 13 on the basis of or by taking into account said corresponding position and/or said corresponding angle of the tester 13 with respect to the vehicle 12.

Again, with respect to the above-mentioned corresponding position and/or the above-mentioned corresponding angle of the tester 13, it is noted that the corresponding position and/or the corresponding angle of the tester 13 with respect to the vehicle 12 can especially be the corresponding position and/or the corresponding angle of the tester 13 with respect to the sensor 11.

Figure 4:
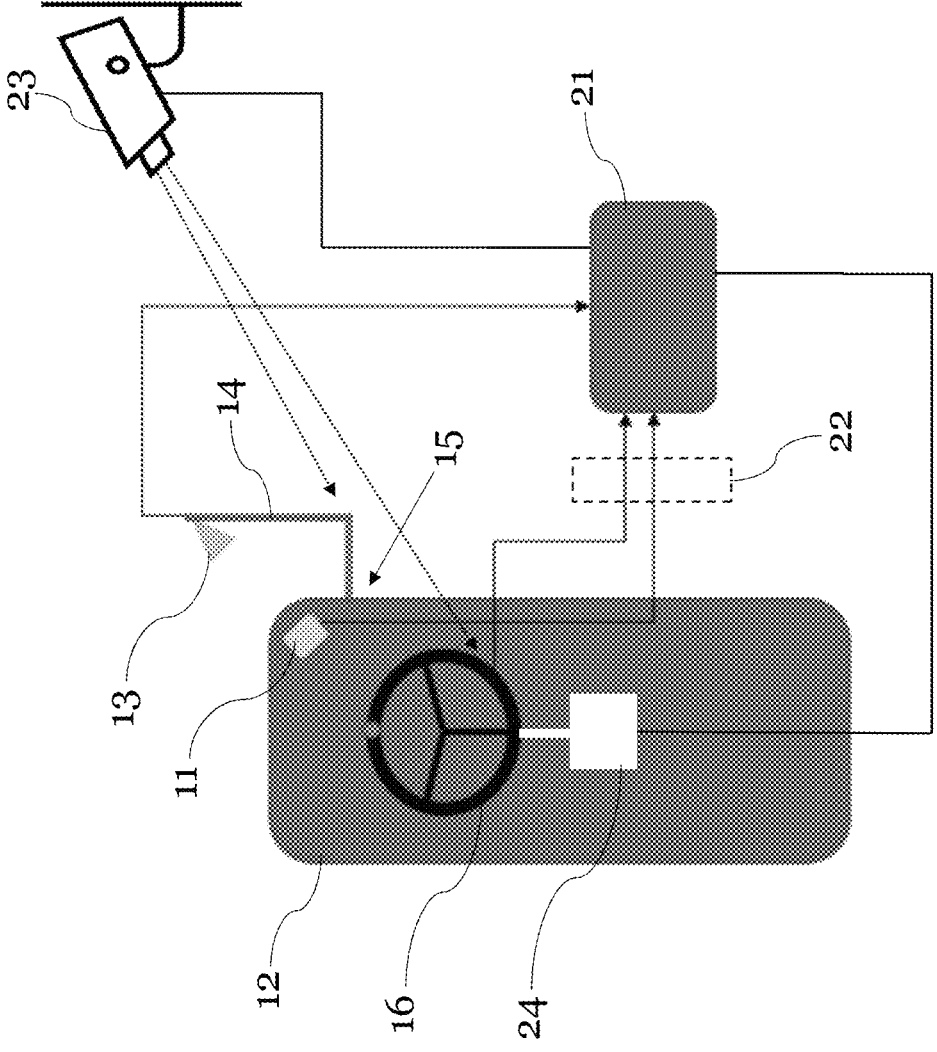
FIG. 4 shows a further exemplary embodiment of a system based on FIG. 3.
Figure 4:

Moreover, in accordance with FIG. 4, a further exemplary embodiment 30 of a system based on the system 20 of FIG.

3 is illustrated. In comparison to the above-mentioned system 20, the system 30 of FIG. 4 further comprises an optical device 23, especially an imager or a scanner or a camera, exemplarily a camera, and an actuator 24.

With respect to the optical device 23, it is noted that it might be particularly advantageous if the optical device 23 is configured to acquire position data and/or status information with respect to the location on which the holding arrangement 14 is arrangeable and/or arranged. The optical device 23 may further be configured to provide said position data and/or status information for the controller 21, especially via a wired and/or wireless and/or virtual and/or indirect connection between the controller 21 and the optical device 23. Advantageously, the system 30 can be operated in an automated manner regardless of vehicle type, thereby increasing not only flexibility but also efficiency.

Especially in this context, it is noted that the location on which the holding arrangement 14 is arrangeable and/or arranged, exemplarily the location of the steerable and/or steered wheel 15 of the vehicle 12, can be provided by a corresponding inspection, especially pre-delivery inspection, or manual, preferably for the controller 21.

Advantageously, the controller 21 can especially be configured to compare the above-mentioned position data and/or status information acquired by the optical device 23 with the foregoing location provided by the corresponding inspection, especially pre-delivery inspection, or manual. In this context, the controller 21 may especially be configured to perform a plausibility check based on said comparison.

It is further noted that it might be particularly advantageous if the optical device 23 is configured to acquire further position data and/or further status information, especially an angle or steering angle, with respect to the steering and/or steering wheel 16 and/or a steerable and/or steered wheel, exemplarily the wheel 15, of the vehicle 12.

Advantageously, the controller 21 can especially be configured to compare said further position data and/or further status information, especially said angle or steering angle, acquired by the optical device 23 with the above-mentioned position data and/or status information, especially the above-mentioned angle or steering angle, acquired by the controller 21, especially via the corresponding wired and/or wireless and/or virtual and/or indirect connection between the controller 21 and the steering of the vehicle 12 and/or the steering wheel 16 of the vehicle 12 and/or a steerable and/or steered wheel, exemplarily the wheel 15, of the vehicle 12. In this context, the controller 21 may especially be configured to perform a plausibility check based on said comparison.

With respect to the above-mentioned further position data and/or further status information, especially the angle or steering angle, it is noted that said further position data and/or further status information, especially said angle or steering angle, can additionally or alternatively be acquired by balancing equipment. Accordingly, it might be particularly advantageous if the system 30 further comprises balancing equipment configured to acquire further position data and/or further status information, especially an angle or steering angle, with respect to the steering and/or steering wheel 16 and/or a steerable and/or steered wheel, exemplarily the wheel 15, of the vehicle 12.

With respect to the above-mentioned actuator 24, it is noted that it might be particularly advantageous if said actuator 24 is configured to actuate the steering and/or the steering wheel 16 and/or a steerable and/or steered wheel, exemplarily the wheel 15, of the vehicle 12.

Advantageously, especially due to exemplary attachment of the holding arrangement 14 to a steerable and/or steered wheel, exemplarily the wheel 15, the position of the tester 13 can be controlled by controlling the steering and/or steering wheel 16 and/or steerable and/or steered wheel, exemplarily the wheel 15, in an automated manner, especially without providing any actuator for the holding arrangement 14 or through embodying the holding arrangement 14 exclusively with passive components, respectively, thereby increasing efficiency or cost-efficiency, respectively.

Figure 5:
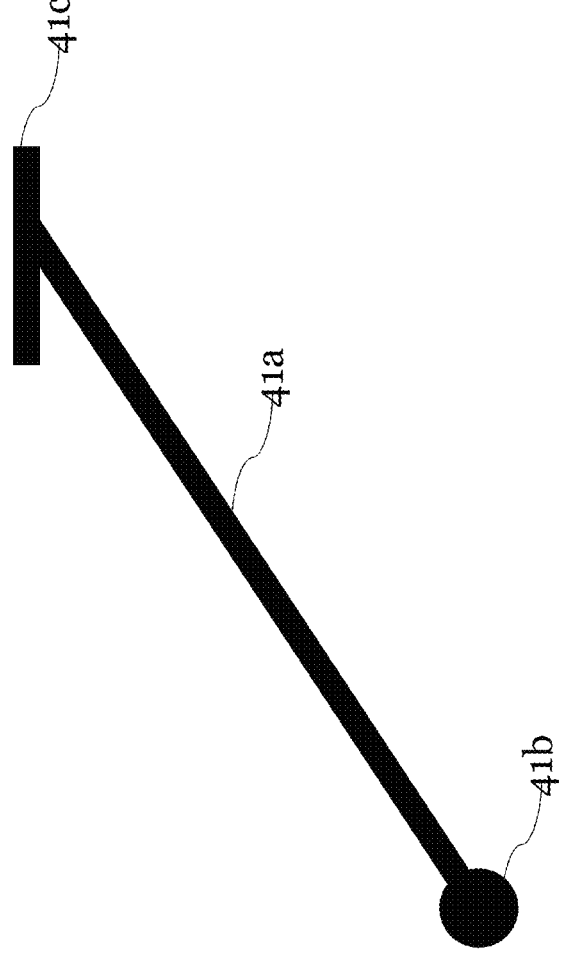
FIG. 5 shows the holding arrangement of FIG. 1 to FIG. 4 in a detailed view.
Figure 5:

Now, with respect to FIG. 5, the above-mentioned holding arrangement 14 or holder, respectively, according to FIG. 1 to FIG. 4 is illustrated in a detailed view. In accordance with FIG. 5, the holding arrangement 14 exemplarily comprises a connecting portion 41a of a certain length with a first end and a second end, an arrangement portion 41b arranged at the first end, and a holding portion 41c arranged at the second end. In this context, the holding portion 41c is adapted to hold a tester, exemplarily the above-mentioned tester 13, especially in front of the sensor to be tested such as the above-mentioned sensor 11. In addition to this, the arrangement portion 41b is adapted to be mounted on a vehicle, exemplarily the vehicle 12.

It is noted that it might be particularly advantageous if the arrangement portion 41b is adapted to be directly mountable and/or directly mounted to the vehicle, especially to a movable and/or rotatable part of the vehicle, exemplarily to the steerable and/or steered wheel 15 of the vehicle 12.

For instance, the arrangement portion 41b can comprise a plate, especially a mounting plate, being arrangeable and/or arranged and/or mountable and/or mounted on a wheel, exemplarily the wheel 15, of the vehicle 12, especially in a parallel or substantially parallel manner.

The foregoing term "substantially parallel" can especially be understood as a deviation of not more than 15 degrees, preferably not more than 10 degrees, more preferably not more than 5 degrees, most preferably not more than 3 degrees, from corresponding parallelism.

With respect to the connecting portion 41a, it is noted that it might be particularly advantageous if the connecting portion 41a is rigid or substantially rigid.

The foregoing term "substantially rigid" can especially be understood as at least 80 percent, preferably at least 85 percent, more preferably at least 95 percent, most preferably at least 99 percent or 100 percent, of the connecting portion 41a, especially the corresponding components and/or parts of the connecting portion 41a, are rigid. Furthermore, the connecting portion 41a can especially be formed in one piece.

It is further noted that it might be particularly advantageous if the connecting portion 41a is arranged with respect to the above-mentioned plate or mounting plate, respectively, in a parallel or substantially parallel manner.

The foregoing term "substantially parallel" can especially be understood as a deviation of not more than 15 degrees, preferably not more than 10 degrees, more preferably not more than 5 degrees, most preferably not more than 3 degrees, from corresponding parallelism.

Especially for arranging the connecting portion 41a with respect to the above-mentioned plate or mounting plate, respectively, the arrangement portion 41b can especially comprise an auxiliary portion, wherein said auxiliary portion may preferably be arranged with respect to the connecting portion 41a and/or the arrangement portion 41b in a perpendicular or substantially perpendicular manner.

The foregoing term "substantially perpendicular" can especially be understood as a deviation of not more than 15 degrees, preferably not more than 10 degrees, more preferably not more than 5 degrees, most preferably not more than 3 degrees, from corresponding orthogonality.

Moreover, with respect to the above-mentioned certain length regarding the connecting portion 41a, it is noted that it might be particularly advantageous if said certain length is between 0.5 meters and 20 meters, preferably between 1 meter and 10 meters, more preferably between 1.5 meters and 5 meters, most preferably between 2 meters and 4 meters.

Figure 6:
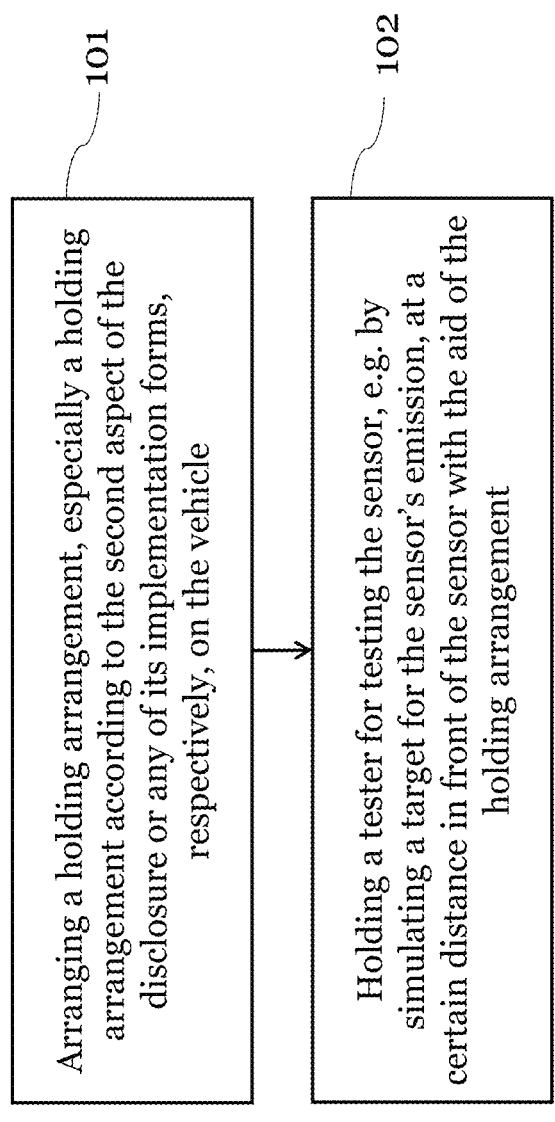
FIG. 6 shows a flow chart of an exemplary embodiment of the third aspect of the invention.

Finally, FIG. 6 illustrates a flow chart of an exemplary embodiment of a method for testing an emitting sensor of a vehicle, such as the above-mentioned sensor 11 of the vehicle 12. A first step 101 comprises mounting a holding arrangement, especially a holding arrangement according to the second aspect of the disclosure or any of its implementation forms, respectively, such as the above-mentioned holding arrangement 14, on the vehicle. A second step 102 comprises holding a tester, such as the above-mentioned tester 13, for testing the sensor, e.g. by simulating a target for the sensor's emission, at a certain distance in front of the sensor with the aid of the holding arrangement.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for testing an emitting sensor of a vehicle, comprising:
   a tester for testing the sensor, and
   a holding arrangement for holding the tester,
   wherein the holding arrangement is adapted to be mounted on the vehicle and to hold the tester at a certain distance in front of the sensor, and
   wherein the holding arrangement is directly mountable to a movable and/or rotatable part of the vehicle.

2. The system according to claim 1,
   wherein the holding arrangement is adapted for movement of the tester.

3. The system according to claim 1,
   wherein the tester comprises or is a radar or lidar object simulator.

4. The system according to claim 1,
   wherein the holding arrangement is rigid or substantially rigid.

5. The system according to claim 1,
   wherein the certain distance is between 0.5 meters and 20 meters.

6. The system according to claim 1,
   wherein the holding arrangement is mountable and/or mounted to at least one wheel of the vehicle.

7. The system according to claim 6, wherein the holding arrangement is mounted to the at least one wheel with the aid of at least one nut and/or at least one bolt.

8. The system according to claim 1, further comprising:

a controller for controlling the tester and/or acquiring testing data from the tester.

9. The system according to claim 1, further comprising:

an optical device for acquiring position data and/or status information with respect to a location on which the holding arrangement is arrangeable and/or arranged.

10. The system according to claim 9, wherein the optical device is configured to acquire further position data and/or further status information with respect to a steering and/or steering wheel and/or a steerable and/or steered wheel of the vehicle.

11. The system according to claim 1, further comprising:

an interface for reading diagnosis data from the vehicle.

12. The system according to claim 11, wherein the diagnosis data comprises or is diagnosis data with respect to a steering and/or steering wheel and/or a steerable and/or steered wheel of the vehicle, and/or wherein the diagnosis data comprises or is diagnosis data with respect to the sensor of the vehicle.

13. The system according to claim 1, further comprising:

an actuator for actuating a steering and/or a steering wheel and/or a steerable and/or steered wheel of the vehicle.

14. A holding arrangement for holding a tester for testing an emitting sensor of a vehicle, comprising:

a connecting portion of a certain length with a first end and a second end, an arrangement portion arranged at the first end, and a holding portion arranged at the second end, wherein the holding portion is adapted to hold the tester, wherein the arrangement portion is adapted to be mounted on the vehicle, and wherein the arrangement portion is adapted to be directly mountable to a movable and/or rotatable part of the vehicle.

15. The holding arrangement according to claim 14, wherein the connecting portion is rigid or substantially rigid.

16. The holding arrangement according to claim 14, wherein the certain length is between 0.5 meters and 20 meters.

17. A method for testing an emitting sensor of a vehicle, comprising the steps of:

mounting a holding arrangement on a movable and/or rotatable part of the vehicle, and holding a tester for testing the sensor at a certain distance in front of the sensor with the aid of the holding arrangement.

\* \* \* \* \*